United States Patent
Okumura (10) Patent No.: US 6,885,293 B2
(45) Date of Patent: Apr. 26, 2005

(54) TIRE AIR PRESSURE MONITORING SYSTEM

(75) Inventor: Ryozo Okumura, Kariya (JP)

(73) Assignee: Denso Corporation, Kariya (JP)

( * ) Notice: Subject to any disclaimer, the term of this patent is extended or adjusted under 35 U.S.C. 154(b) by 38 days.

(21) Appl. No.: 10/657,164

(22) Filed: Sep. 9, 2003

(65) Prior Publication Data

US 2004/0066288 A1 Apr. 8, 2004

(30) Foreign Application Priority Data

Sep. 24, 2002 (JP) .......................................... 2002-278003
Jun. 3, 2003 (JP) .......................................... 2003-158372

(51) Int. Cl.$^7$ .............................................. B60C 23/00
(52) U.S. Cl. ..................... 340/448; 340/438; 340/442; 340/445; 340/447; 116/34 R; 73/146; 73/146.2
(58) Field of Search ............................... 340/448, 438, 340/442, 445, 447; 116/34 R; 73/146, 146.2

(56) References Cited

U.S. PATENT DOCUMENTS

| | | |
|---|---|---|
| 5,602,524 A | 2/1997 | Mock et al. |
| 6,169,480 B1 * | 1/2001 | Uhl et al. ................. 340/442 |
| 6,194,999 B1 * | 2/2001 | Uhl et al. ................. 340/447 |
| 6,535,116 B1 * | 3/2003 | Zhou ...................... 340/447 |
| 6,668,637 B1 * | 12/2003 | Ono et al. ............... 73/146.5 |

FOREIGN PATENT DOCUMENTS

JP          3212311          7/2001

* cited by examiner

Primary Examiner—Daryl C Pope
(74) Attorney, Agent, or Firm—Posz Law Group, PLC (57) ABSTRACT

Provided is a tire air pressure monitoring system capable of grasping the tire positions where there are sensor units even in the case of tire rotation. In the tire air pressure monitoring system, a trigger signal is transmitted from a transmission coil antenna to only the corresponding sensor unit in a manner such that a magnetic field is used as a medium and, upon receipt of the trigger signal, the sensor unit measures a tire air pressure and others and transmits a transmission signal including the measurement values to a monitoring unit. The monitoring unit makes a decision on the tire position where there is the sensor unit on the basis of the transmission signal from the sensor unit.

6 Claims, 5 Drawing Sheets

TIRE AIR PRESSURE MONITORING SYSTEM

BACKGROUND OF THE INVENTION

1. Field of the Invention

The present invention relates to a tire air pressure monitoring system designed to monitor an air pressure state of each of tires of a vehicle.

2. Description of the Related Art

So far, there have been proposed various types of systems for monitoring an air pressure of each of tires of a vehicle. One of such tire air pressure monitoring systems is disclosed in Japanese Patent No. 3212311 in which a sensor unit comprising a sensor for measuring a tire air pressure and a transmitter for transmitting the tire air pressure measurement value is provided in each of tires and a monitoring unit receives a signal transmitted from the sensor unit to address a warning if each tire air pressure measurement value falls below a predetermined value.

In this conventional tire air pressure monitoring system, for grasping the position of the tire equipped with each of the sensor units, a specific ID code allocated to each of the sensor units is registered in the monitoring unit in a state associated with the tire position. With this arrangement, when receiving a transmitted signal including an air pressure measurement value and an ID code, the monitoring unit can grasp, on the basis of the ID code, the sensor unit which has made the signal transmission and the tire holding that sensor unit. Accordingly, since the tire position is detectable in this way, when a decision is made, on the basis of the air pressure measurement value, that the tire air pressure is in an abnormal condition, it is possible to specify the tire position and to make the notification about the abnormality of the tire air pressure.

However, the aforesaid registration of the ID code of each of the sensor units in the monitoring unit in a state associated with the tire position requires troublesome operations. That is, the operating mode of the monitoring unit is switched from the monitoring mode to the registration mode through the switch operation on the monitoring unit and the tire position is set for the registration of the ID code. In this state, for example, by rapidly decreasing the tire air pressure, an ID code is forcibly transmitted from the sensor unit at the corresponding tire position to be registered in the monitoring unit. These operations are conducted with respect to all the tires of a vehicle.

In addition, even in a case in which the ID code of each of the sensor units is registered in the monitoring unit in a state associated with the tire position through the aforesaid operations, if the vehicle' user carries out the tire rotation in order to uniformize the abrasive states of the tires, the association between the registered ID codes and the tire positions makes no sense anymore.

SUMMARY OF THE INVENTION

The present invention has been developed with a view to eliminating the above-mentioned problems, and it is therefore an object of the invention to provide a tire air pressure monitoring system capable of grasping the tire position, at which each of the sensor units exists, even in the case of the tire rotation, without requiring the complicated registration operations.

For this purpose, in accordance with an aspect of the present invention, there is provided a tire air pressure monitoring system comprising a plurality of sensor units each provided in each of tires of a vehicle for measuring an air pressure of the corresponding tire and for transmitting a transmission signal including the air pressure measurement value and a monitoring unit for receiving the transmission signal from each of the plurality of sensor units to monitor an air pressure state of each of the tires on the basis of the air pressure measurement value included in the transmission signal, wherein the monitoring unit includes a plurality of transmitting means provided in a state associated with the plurality of sensor units, respectively, and each of the transmitting means transmits an instruction signal calling for the transmission of the transmission signal and has a transmission zone so that the instruction signal reaches only the corresponding sensor unit, and each of the plurality of sensor units includes receiving means for receiving the instruction signal and, when receiving the instruction signal, the receiving means transmits the transmission signal in response to the instruction signal.

Thus, since the transmitting means is provided in the monitoring unit to transmit the instruction signal calling for the transmission of the transmission signal to only the corresponding sensor unit, even if the ID code of a sensor unit is not registered in a state associated with the tire position, the tire position at which the sensor unit exists is recognizable. That is, since the monitoring unit has the information on which transmitting means has transmitted the instruction signal, it is possible to recognize the tire position corresponding to the sensor unit which has transmitted the transmission signal in response to the instruction signal.

In the aforesaid tire air pressure monitoring system, each of the transmitting means has a transmission coil antenna made to transmit the instruction signal in a manner such that a magnetic field is used as media, and the transmission coil antenna is located in the vicinity of an axle of the corresponding tire wheel or around the corresponding tire and the central axis of the transmission coil antenna is located along the tire wheel axle so that a magnetic flux goes in a direction of the tire wheel axle, while the receiving means of each of the sensor units has a reception coil antenna receiving the magnetic flux, and the reception coil antenna is located so that the central axis of the reception coil antenna coincides in direction with the central axis of the transmission coil antenna.

In a case in which the transmitting means is made to transmit an instruction signal in a manner such that the magnetic field is used as media, since the magnetic field attenuates in proportion to the cube of distance, the transmission zone of the transmitting means can easily be set so that the instruction signal reaches only the corresponding sensor unit. Moreover, since the transmission coil antenna is placed in the vicinity of the axle of each tire wheel or around each tire and the central axes of the transmission coil antenna and the reception coil antenna take the same direction, even if the positional relationship between both the antennas varies due to the revolution of the tire, a satisfactory communication state is maintainable at all times.

Preferably, the transmitting means transmits an instruction signal including a different identification code to each of the sensor units, while the sensor unit transmits a transmission signal including the identification code in response to the instruction signal. Thus, when the monitoring unit receives a transmission signal, the monitoring unit can confirm that the transmission signal is a response signal responsive to its own instruction signal.

Moreover, preferably, in the monitoring unit, the plurality of transmitting means transmit instruction signals at timings different from each other. This prevents the transmission signals from the respective sensor units from interfering with each other and secures satisfactory receptions of the transmission signals therefrom.

Still moreover, preferably, the monitoring unit further includes passenger detecting means for detecting that a passenger gets in a vehicle, and the monitoring unit transmits the instruction signal to each of the sensor units when the passenger detecting means detects that the passenger gets in the vehicle. According to the present invention, the monitoring unit can determine the transmission timings in the sensor units, and, if a passenger does not get in a vehicle and the vehicle is in a stopping condition, inhibits the transmission from the sensor units, thereby reducing the power dissipation in the sensor units.

Yet moreover, preferably, the instruction signal is transmitted in a manner such that a low-frequency signal having over a hundred kHz or over a ten MHz is used as a carrier. When a low-frequency signal is used as a carrier for the instruction signal, the instruction signal goes into a wrap-around state, thereby maintaining satisfactory communications with the sensor units placed in the tires.

BRIEF DESCRIPTION OF THE DRAWINGS

Other objects and features of the present invention will become more readily apparent from the following detailed description of the preferred embodiment taken in conjunction with the accompanying drawings in which.

DESCRIPTION OF THE PREFERRED EMBODIMENTS

An embodiment of the present invention will be described hereinbelow with reference to the drawings. This embodiment relates to an example in which a tire air pressure monitoring system according to the present invention is applied to a four-wheel passenger vehicle. However, the tire air pressure monitoring system according to the present invention is also applicable to other vehicles such as a motor truck and bus.

Figure 1:
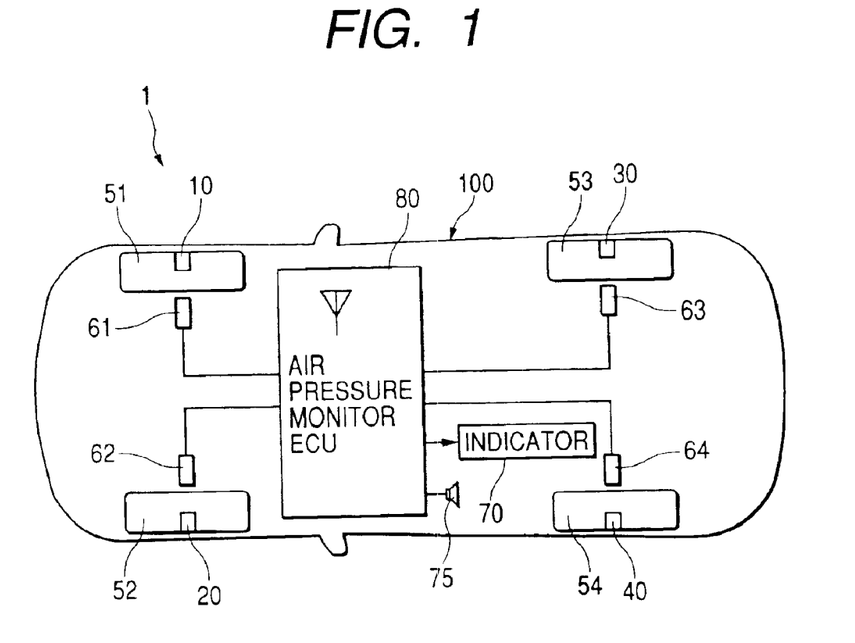
FIG. 1 schematically shows a configuration of a tire air pressure monitoring system according to an embodiment of the present invention.

FIG. 1 is a schematic illustration of a configuration of a tire air pressure monitoring system according to this embodiment. As FIG. 1 shows, the tire air pressure monitoring system, generally designated at reference numeral 1, comprises sensor units 10, 20, 30 and 40 respectively provided in tires 51, 52, 53 and 54 of a vehicle for measuring tire air pressures and for transmitting signals including the air pressure measurement values. In addition, the tire air pressure monitoring system comprises a monitoring unit 100 provided in the vehicle side for receiving the signals transmitted from the sensor units 10, 20, 30 and 40 to monitor the air pressure states of the tires 51, 52, 53 and 54 on the basis of the air pressure measurement values included in the transmitted signals. This monitoring unit 100 is composed of transmission coil antennas 61, 62, 63 and 64 for transmitting trigger signals calling for the starting of the air pressure measurements, an air pressure monitor ECU 80 including a receiving circuit for receiving the transmitted signals from the sensor units 10, 20, 30 and 40, and others, and an indicator 70.

In this configuration, all the sensor units 10, 20, 30 and 40 are designed to have the same arrangement, and all the transmission coil antennas 61, 62, 63 and 64 provided in relation to the sensor units 10, 20, 30 and 40 are also made to have the same construction, and the description will be given hereinbelow of only the sensor unit 10 provided in the front-right tire and the transmission coil antenna 61 placed in relation to the sensor unit 10.

Figure 2A:
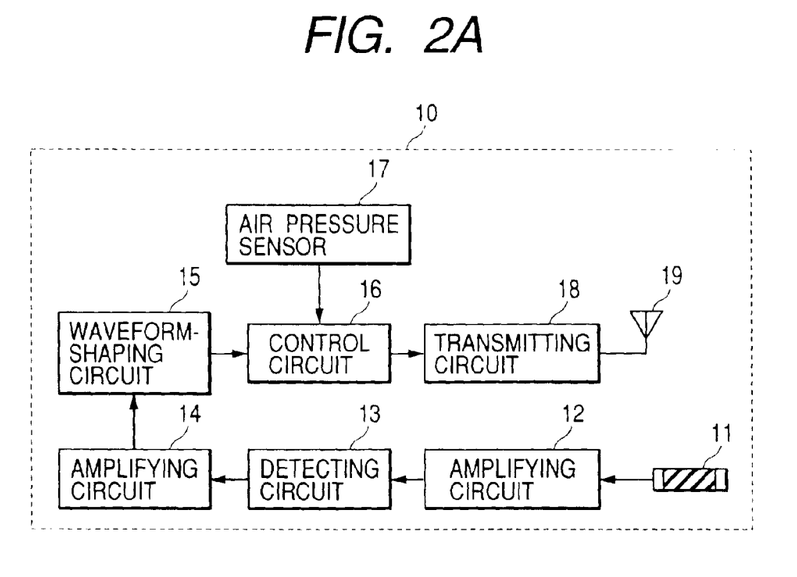
FIG. 2A is a block diagram showing an internal configuration of a sensor unit according to this embodiment.

FIG. 2A is a block diagram showing an internal configuration of the sensor unit 10. As FIG. 2A shows, the sensor unit 10 is composed of an air pressure sensor 17, a control circuit 16 for producing a transmission signal including the measured air pressure and a specific (peculiar) ID code, a transmitting circuit 18 for transmitting the transmission signal in a manner such that an electric wave (for example, an RF (Radio Frequency) signal in a band of several hundreds MHz) is used as a carrier, and a transmission antenna 19. Moreover, the sensor unit 10 includes a reception coil antenna 11 for receiving a trigger signal serving as an instruction signal transmitted from the transmission coil antenna 61 in a manner such that a magnetic field is used as a medium and a low-frequency signal (for example, over a hundred kHz or over a ten MHz) is used as a carrier, an amplifying circuit 12 for amplifying the received trigger signal, a detecting circuit 13 for detecting the amplified trigger signal in a state separated from the carrier, an amplifying circuit 14 for amplifying the detected trigger signal, a waveform-shaping circuit 15 for waveform-shaping the amplified trigger signal.

The trigger signal is transmitted as a different code signal from each of the transmission coil antennas 61, 62, 63 and 64 of the monitoring unit 100 to each of the sensor units 10, 20, 30 and 40. Moreover, for example, when a trigger signal is transmitted from the transmission coil antenna 61 to the sensor unit 10, the trigger signal is received by the reception coil antenna 11 and is then inputted to the control circuit 16 after being subjected to the processing in the amplifying circuit 12, the detecting circuit 13, the amplifying circuit 14 and the waveform-shaping circuit 15. Upon receipt (input) of the trigger signal, the control circuit 16 outputs, to the transmitting circuit 18, a transmission signal including the measured air pressure value, the specific ID code and the inputted code signal, and the transmitting circuit 18 transmits the transmission signal.

Incidentally, the sensor units 10, 20, 30 and 40 are mounted in the tires 51, 52, 53 and 54 in a manner such that they are constructed integrally with the tire valves or they are directly attached to the tire disc wheels. Moreover, it is also appropriate that, in addition to the air pressure sensor 17, each of the sensor units 10, 20, 30 and 40 includes a temperature sensor for measuring a temperature. This enables the decision on the tire air pressure state to be made in consideration of the fluctuation of the tire air pressure stemming from the temperature variation.

Figure 2B:
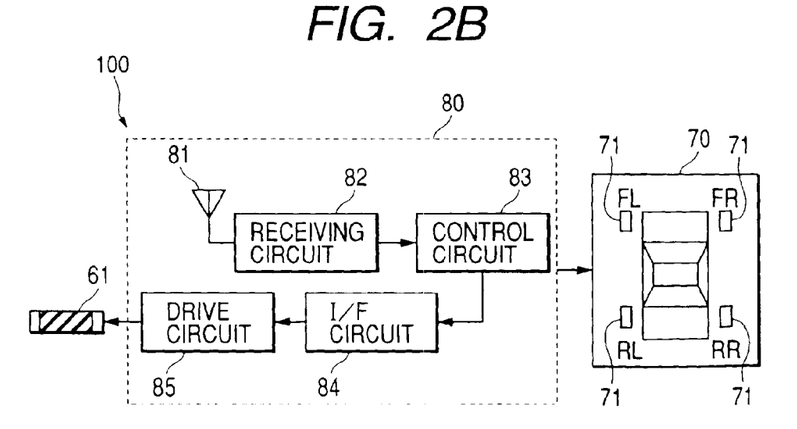
FIG. 2B is a block diagram showing an internal configuration of a monitoring unit according to this embodiment.

Secondly, referring to FIG. 2B, a detailed description will be given hereinbelow of a configuration of the monitoring unit 100. FIG. 2B is a block diagram showing a configuration of the monitoring unit 100.

As FIG. 2B shows, the air pressure monitor ECU 80 of the monitoring unit 100 includes a reception antenna 81 for receiving a transmission signal from each of the sensor units 10, 20, 30 and 40. The signal received by the reception antenna 81 is fed to a receiving circuit 82 to undergo the processing such as amplification and detection. Following this, in a control circuit 83, an ID code, a code signal, an air pressure measurement value and others are extracted from the received signal, and a decision on the air. pressure state of each of the tires 51, 52, 53 and 54 is made on the basis of the air pressure measurement values included in the received signal.

Incidentally, although the reception antenna 81 and the receiving circuit 82 are provided in the air pressure monitor ECU 80 in common to the respective sensor units 10, 20, 30 and 40, it is also acceptable that they are provided for each of the sensor units 10, 20, 30 and 40. In this case, each of the reception antennas can be placed in the vicinity of each of the sensor units 10, 20, 30 and 40, such as is placed in the wheel house or the like, satisfactory reception of the transmission signals are feasible.

The decision results on the air pressure states of the tires 51, 52, 53 and 54 in the air pressure monitor ECU 80 are put on the indicator (display) 70 mounted on an instrumental panel in the interior of the vehicle. It is also appropriate that, if an abnormal air pressure occurs, an alarm sound is issued through the use of a buzzer 75 (see FIG. 1).

As shown in FIG. 2B, the indicator 71 includes indicating portions 71 made with an LED and located in a state associated with the positions of the tires 51, 52, 53 and 54. If the air pressure monitor ECU 50 makes a decision that a tire air pressure falls into an abnormal condition, for example, the tire air pressure falls below a predetermined value, the indicating portion 71 corresponding to the tire having the abnormal air pressure is lighted and/or the buzzer 75 is sounded, thereby notifying the abnormality of the tire air pressure to the driver.

Incidentally, it is also appropriate that, as the indicator 70, a display is used which is capable of directly displaying the air pressure measurement values of the respective tires 51, 52, 53 and 54, or that, for example, without using indicating portions which are equal in number to the positions of the tires 51, 52, 53 and 54, only one warning lamp is provided in the indicator 70 so that, if the air pressure values of one or more tires take an abnormal value, the warning lamp is lighted to make a notification on the abnormality of tire air pressure.

In addition, for the transmission of a trigger signal from the transmission coil antenna 61, the air pressure monitor ECU 80 includes an interface (I/F) circuit 84 and a drive circuit 85. That is, the control circuit 83 operates the drive circuit 85 through the IF circuit 84, and the drive circuit 85 supplies a current to the transmission coil antenna 61 so that the transmission coil antenna 61 transmits a trigger signal comprising a predetermined code signal in a manner such that a magnetic field is used as media.

Figure 3:
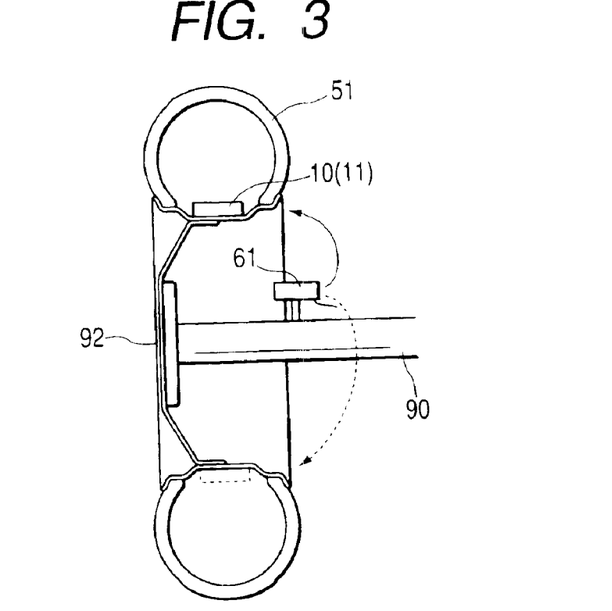
FIG. 3 is an illustrative view showing the positional relationship between a transmission coil antenna and a reception coil antenna according to this embodiment.

Furthermore, referring to FIG. 3, a description will be given hereinbelow of the locations of the transmission coil antenna 61 in the monitoring unit 100 and the reception coil antenna 11 in the sensor unit 10. As FIG. 3 shows, the transmission antenna 61 is fixedly secured to, for example, an axle housing 90 or the like to be placed in the vicinity of an axle (not shown) for the tire 51 to arrange the central axis of the transmission coil antenna 61 along the axle so that the magnetic flux goes in the axle direction. Incidentally, in addition to the axle housing 90, it is also acceptable that the transmission coil antenna 61 is fixedly secured to a steering knuckle, a suspension arm or the like.

The sensor unit 10 including the reception coil antenna 11 is fixedly secured to a disc wheel 92 of the tire 51. At this time, the sensor unit 10 is fixed to the disc wheel 92 so that the central axis of the reception coil antenna 11 coincides in direction with the central axis of the transmission coil antenna 61. When the central axes of the transmission coil antenna 61 and the reception coil antenna 11 are arranged to take the same direction, in cooperation with the employment of a low-frequency signal as the carrier for a trigger signal, even if the positional relationship between both the antennas 11 and 61 varies due to the revolution of the tire 51, a magnetic flux generated from the transmission coil antenna 61 effectively crosses the reception coil antenna 11 as indicated by solid and dotted lines in FIG. 3 to produce a current corresponding to the magnetic flux. Therefore, satisfactory communications are maintainable between both the antennas 11 and 61.

Figure 4:
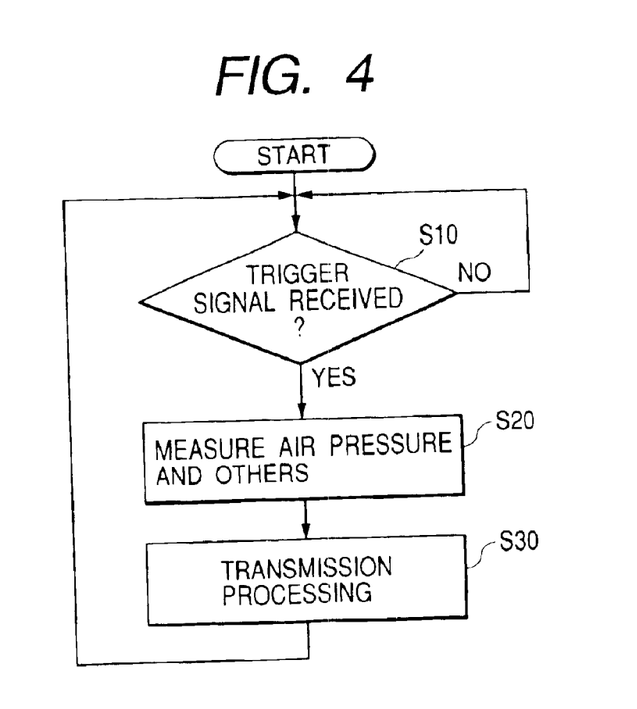
FIG. 4 is a flow chart showing processing to be implemented in the sensor unit according to this embodiment.
Figure 5:
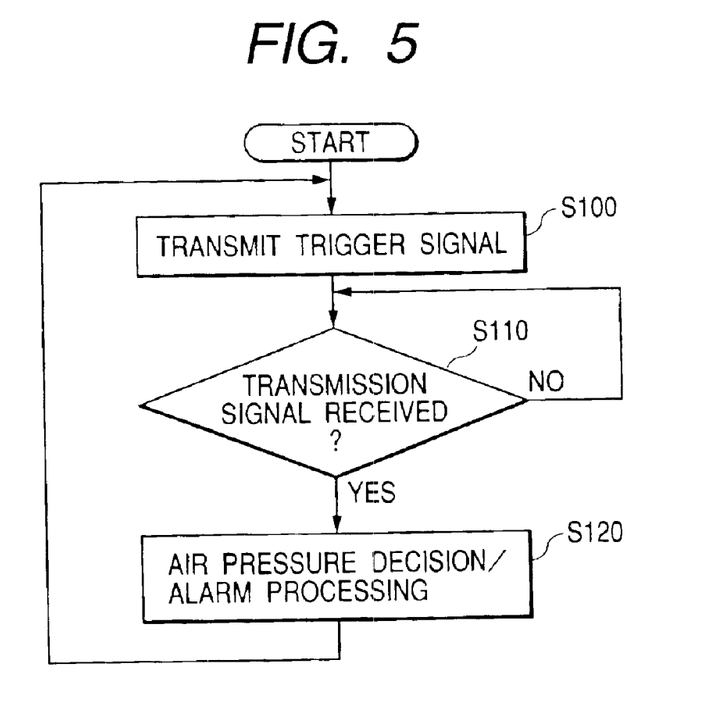
FIG. 5 is a flow chart showing processing to be implemented in the monitoring unit according to this embodiment.

Referring to flow charts of FIGS. 4 and 5, a description will be given hereinbelow of a flow of arithmetic operations to be implemented in the tire air pressure monitoring system 1 having the above-described configuration. FIG. 4 is a flow chart showing the processing to be executed in each of the sensor units 10, 20, 30 and 40, and FIG. 5 is a flow chart showing the processing to be executed in the monitoring unit 100. The operations to be executed in the sensor units 10, 20, 30 and 40 are the same, and the description thereof will be given with respect to only the sensor unit 10.

In FIG. 4, in a step S10, a decision is made on the reception of a trigger signal transmitted from the transmission coil antenna 61. In the case of the reception of the trigger signal, the operational flow advances to a step S20. On the other hand, in the case of no reception thereof, the operation falls into a waiting condition until the reception thereof.

In the step S20, the air pressure sensor 17 measures an air pressure. In a case in which the sensor unit 10 is equipped with a temperature sensor, the temperature sensor measures a temperature in the interior of the tire. Thus, the sensor unit 10 starts to measure the air pressure and others.

After the measurement of the air pressure and others in the step S20, a step S30 follows to carry out the transmission processing. In this transmission processing, the control unit 16 produces a transmission signal including at least an air pressure measurement value, a specific ID code allocated to the sensor unit 10 and a code of the received trigger signal. The produced transmission signal is transmitted through the transmitting circuit 18 and the transmission antenna 19. The aforesaid specific ID code is given in advance to each of the sensor units 10, 20, 30 and 40 and is stored in a memory (not shown) of the control circuit 16.

Secondly, referring to a flow chart of FIG. 5, a description will be given hereinbelow of the processing to be implemented in the monitoring unit 100. The processing shown in this flow chart starts in response to the turning-on of the ignition switch of the vehicle.

First, in a step S100, different code signals are transmitted as trigger signals at a predetermined time interval from the transmission coil antennas 61, 62, 63 and 64 provided in relation to the sensor units 10, 20, 30 and 40, respectively.

Subsequently, in a step S110, a decision is made as to whether received are the transmission signals transmitted from the sensor units 10, 20, 30 and 40 in response to the trigger signals. In the case of the reception of the transmission signals, the operational flow advances to a step S120 to carry out the decision processing on the air pressure of each of the tires 51, 52, 53 and 54 and, if the air pressure is at an abnormal value, perform the alarm processing. In this air pressure decision processing, the ID code included in the received signal is first collated with an ID code registered in advance to make a decision as to whether or not they satisfy a predetermined relationship, for example, whether or not they agree with each other. When this decision shows that the received signal is from each of the sensor units 10, 20, 30 and 40 of the tires 51, 52, 53 and 54 mounted on the vehicle, a decision is made as to whether or not the measurement value such as an air pressure value, included in the received signal, is an appropriate value. In this embodiment, since an ID code is allocated to each of the sensor units 10, 20, 30 and 40 as mentioned above, it is possible to prevent the tire air pressure decision from being made in error on the basis of signals from another vehicle or the like, thereby improving the reliability on the monitoring of the tire air pressure.

As mentioned above, since a code signal transmitted from the monitoring unit 100 is incorporated into a transmission signal from each of the sensor units 10, 20, 30 and 40, when receiving the transmission signal, the monitor unit 100 can confirm the position of the tire 51, 52, 53 or 54 equipped with the sensor unit 10, 20, 30 or 40 which has issued that transmission signal.

That is, the monitoring unit 100 transmits as trigger signals different code signals from the transmission coil antennas 61, 62, 63 and 64 provided in relation to the sensor units 10, 20, 30 and 40, respectively. This trigger signal is transmitted in a manner such that the magnetic field is used as media and the magnetic field attenuates in proportion to the cube of distance and, hence, the trigger signal transmission zone is limited to only the corresponding one of the sensor units 10, 20, 30 and 40. Since the monitoring unit 100 knows the code of a trigger signal and the location of the transmission coil antenna 61, 62, 63 or 64 which has transmitted that trigger signal, when receiving the transmission signal from one of the sensor units 10, 20, 30 and 40, the monitoring unit 100 can seize the position of the sensor unit 10, 20, 30 or 40 on the basis of the code signal included in the received signal.

Figure 6:
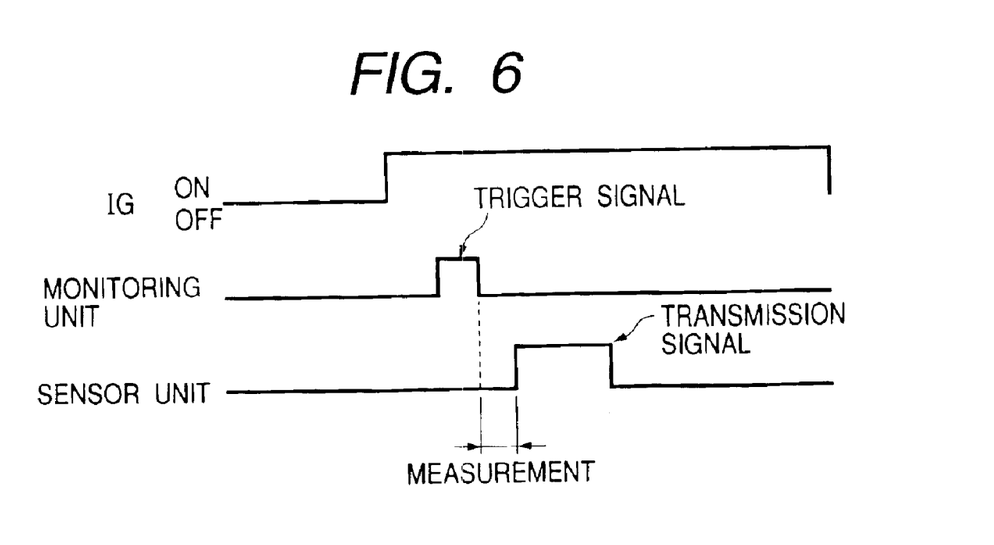
FIG. 6 is a time chart showing generation timings of a trigger signal and a transmission signal according to this embodiment.

However, as mentioned above, in this embodiment, since the trigger signal from one of the transmission coil antennas 61, 62, 63 and 64 reaches only the corresponding one of the sensor units 10, 20, 30 and 40, without using the code signals, it is possible to make a decision on the positions of the sensor units 10, 20, 30 and 40. As shown in FIG. 6, when the ignition switch (IG) is turned on, the monitoring unit 100 successively transmits trigger signals intermittently to the sensor units 10, 20, 30 and 40. Upon receipt of the trigger signals, each of the sensor units 10, 20, 30 and 40 starts to measure the air pressure and others. At the time of the completion of the measurements of the air pressure and others, it transmits a transmission signal including an ID code and an air pressure measurement value. Therefore, when the interval at which the trigger signals are successively transmitted from the transmission coil antennas 61, 62, 63 and 64 is set to be longer than with respect to the interval (time length) from which the trigger signals are transmitted until the transmission signals from the sensor units 10, 20, 30 and 40 are received, it is possible to make a decision about which of the trigger signals has caused that transmission signal, that is, to distinguish among the transmission signals. Moreover, when the timings of the trigger signals being outputted from the transmission coil antennas 61, 62, 63 and 64 are shifted from each other in this way, it is possible to prevent the radio interference among the transmission signals from the sensor units 10, 20, 30 and 40.

In the above-described air pressure decision processing, a decision is made that the tire air pressure is in an abnormal condition, for example, if the tire air pressure falls below an appropriate range, the alarm processing is conducted such that the indicating portion 71 corresponding to the tire position detected from the code signal included in the received signal is lighted to notify the air pressure abnormality to the driver. Accordingly, the driver can immediately obtain the information about which of the tires 51, 52, 53 and 54 of the vehicle shows the abnormal air pressure.

As described above, in this embodiment, trigger signals are transmitted from the transmission coil antennas 61, 62, 63 and 64 to the corresponding sensor units 10, 20, 30 and 40 in a manner such that a magnetic field is used as media and the sensor units 10, 20, 30 and 40 transmit transmission signals in response to the trigger signals. Accordingly, in the monitoring unit 100, even if the ID codes of the sensor units 10, 20, 30 and 40 are not registered in a state associated with the tire positions where there are the sensor units 10, 20, 30 and 40, it is possible to make a discrimination among the tire positions where there are the sensor units 10, 20, 30 and 40.

Incidentally, although the above-described embodiment the transmission coil antenna 61 and the reception coil antenna 11 are used only for the transmission and reception of the trigger signals, it is also appropriate that the transmission signal including the air pressure measurement value, the ID code and others is transmitted in a manner such that the reception coil antenna 11 is used as a transmission antenna and the transmission coil antenna 61 is used as a reception antenna.

Moreover, it is also appropriate that a capacitor is provided which is made to temporarily store a current generated in the reception coil antenna 11 due to a magnetic flux emitted from the transmission coil antenna 61 and a transmission signal is transmitted from the sensor unit 10 by using the capacitor as a power source. In this case, since a low-frequency signal is used as a carrier for a trigger signal (instruction signal), the power dissipation needed for the amplification and detection thereof is reducible, thus easily securing the power for the transmission of transmission signals.

Still moreover, in the above-described embodiment, in order to notify the air pressure states of the tires 51, 52, 53 and 54 when a passenger is in the interior of the vehicle, the processing shown in the flow chart of FIG. 5 is implemented only when the ignition switch of the vehicle is in the on-condition. On the other hand, for detecting the fact that a passenger is in the interior of a vehicle, in addition to the ignition switch, it is possible to employ, for example, an accessory switch (ACC) or a seating sensor placed in a seat, and it is also appropriate that the air pressure detection and the notification of the detection result are made when such a switch indicates that a passenger is in the interior of the vehicle.

Figure 7:
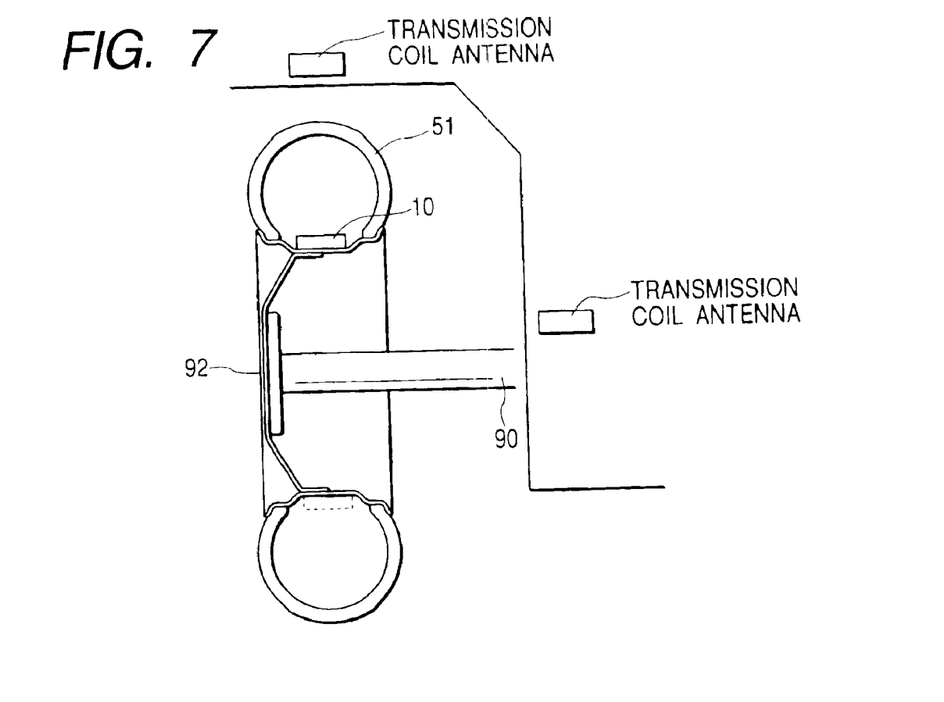
FIG. 7 is an illustrative view showing a modification of a location of the transmission coil antenna according to this embodiment.

In addition, although in the above-described embodiment the transmission coil antenna 61 is located in the vicinity of the axle, such as is mounted on the axle housing 90, it is also appropriate that the transmission coil antenna 61 is located around the tire 51, that is, it is located on a vehicle body portion above or beside the tire 51, as shown in FIG. 7. Also in this case, the inter-antenna communications are feasible irrespective of the revolution of the sensor unit 10, provided that the central axis of the transmission coil antenna 61 and the central axis of the reception coil antenna 11 proceed in the same direction.

Figures 8A, 8B:
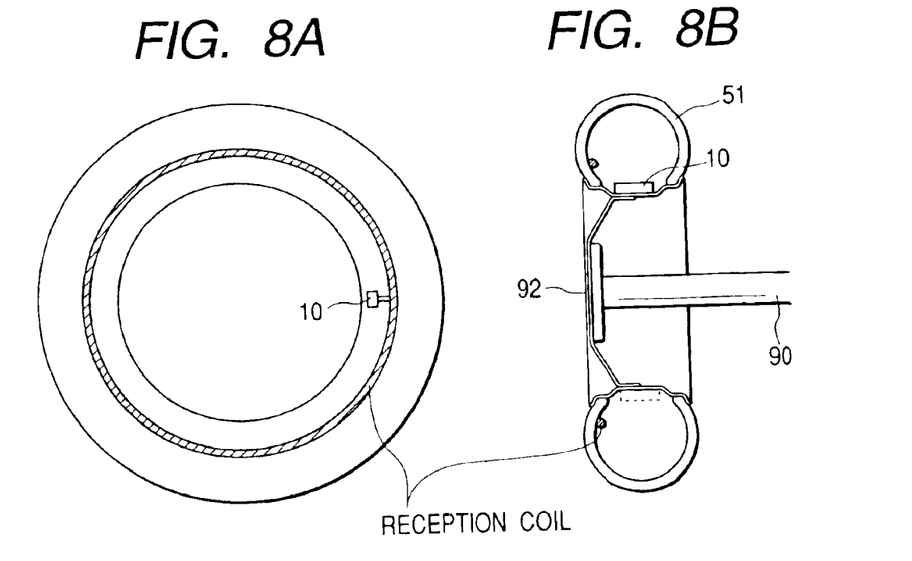
FIGS. 8A and 8B are illustrations of a modification of the reception coil antenna according to this embodiment.

Still additionally, as the reception coil antenna 11, it is possible to use a type which is built in the sensor unit 10 as mentioned above in this embodiment, and as shown in FIGS. 8A and 8B, it is also possible to employ a large-diameter type in which an antenna line is wound several times along an inner circumference of the tire or along an outer circumference of the disc wheel.

It should be understood that the present invention is not limited to the above-described embodiment, and that it is intended to cover all changes and modifications of the embodiment of the invention herein which do not constitute departures from the spirit and scope of the invention.

What is claimed is:

1. A tire air pressure monitoring system comprising:
a plurality of sensor units each provided in each of tires of a vehicle for measuring an air pressure of the corresponding tire and for transmitting a transmission signal including the air pressure measurement value; and
a monitoring unit for receiving said transmission signal from each of said plurality of sensor units to monitor an air pressure state of each of said tires on the basis of the air pressure measurement value included in said transmission signal,
wherein said monitoring unit includes a plurality of transmitting means provided in a state associated with said plurality of sensor units, respectively, and each of said transmitting means transmits an instruction signal calling for the transmission of said transmission signal and has a transmission zone so that said instruction signal reaches only the corresponding sensor unit, and
each of said plurality of sensor units includes receiving means for receiving said instruction signal and, when receiving said instruction signal, said receiving means transmits said transmission signal in response to said instruction signal.

2. The system according to claim 1, wherein each of said transmitting means has a transmission coil antenna made to transmit said instruction signal in a manner such that a magnetic field is used as a medium, and said transmission coil antenna is located in the vicinity of an axle for the corresponding tire wheel or around the corresponding tire, and the central axis of said transmission coil antenna is located along said axle so that a magnetic flux goes in a direction of said axle, while said receiving means of each of said sensor units has a reception coil antenna for receiving said magnetic flux, and said reception coil antenna is located so that the central axis of said reception coil antenna coincides in direction with the central axis of said transmission coil antenna.

3. The system according to claim 2, wherein said transmitting means transmits an instruction signal including a different identification code to each of said sensor units, while said sensor unit transmits a transmission signal including said identification code in response to said instruction signal.

4. The system according to claim 1, wherein said monitoring unit makes said plurality of transmitting means transmit said instruction signals at timings different from each other.

5. The system according to claim 1, wherein said monitoring unit further includes passenger detecting means for detecting that a passenger exists in the interior of said vehicle, and said monitoring unit transmits said instruction signal to each of said sensor units when said passenger detecting means detects that the passenger exists in the interior of said vehicle.

6. The system according to claim 1, wherein said instruction signal is transmitted in a manner such that a low-frequency signal having over a hundred kHz or over a ten MHz is used as a carrier.

* * * * *